Dec. 4, 1962
C. F. SPADEMAN
3,066,752
WEIGHING DEVICE
Filed May 24, 1956
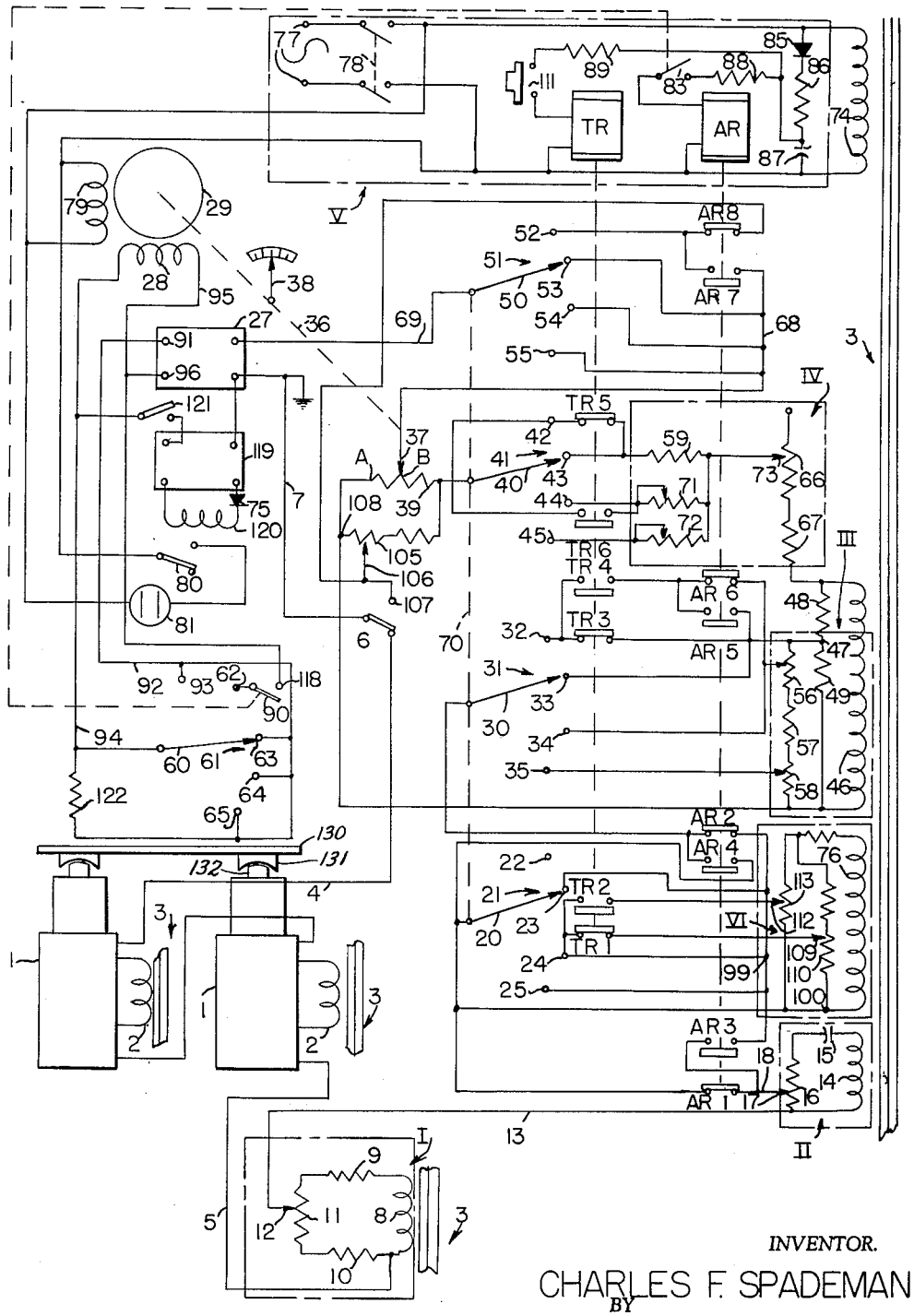
INVENTOR.
CHARLES F. SPADEMAN
BY
*Marshall, Marshall & Yeasting*
ATTORNEYS United States Patent Office 3,066,752
Patented Dec. 4, 1962

3,066,752
WEIGHING DEVICE
Charles F. Spademan, Toledo, Ohio, assignor, by mesne assignments, to Toledo Scale Corporation, Toledo, Ohio, a corporation of Ohio
Filed May 24, 1956, Ser. No. 586,986
7 Claims. (Cl. 177—211)

This invention relates to electrical scales and more particularly to weighing and checkweighing scales which electrically determine deviations from a predetermined weight or range of weight and to methods of operating such scales.

One object of this invention is to combine accurate weighing and checkweighing functions in a single apparatus.

Another object is to determine rapidly whether the weight of an object being weighed is in excess of or fails to fall within a predetermined range of weight.

A further object is to facilitate the accurate adjustment of a checkweigh scale.

Additional objects are to transfer conveniently and rapidly from weighing to checkweighing at one or more predetermined magnitudes of weight in a single apparatus, to simplify electrical checkweighers, and to improve the reliability of electrical checkweighers.

Horetofore attempts have been made to combine weighing and checkweighing functions in scales having electrically actuated indicators. These scales have in general involved the application of electrical sensing elements in combination with limit switches or their equivalents to conventional mechanical lever balance, and spring scales at some convenient location in the mechanical system. Such systems have been fraught with difficulties particularly where high response speeds and heavy loads are to be measured as in the case of moving vehicles. The inertia of such systems is a primary limitation on their capabilities.

The combination of weighing and checkweighing in electrical scales has required the separate calibration of the scale for each functional combination. Thus in each instance where it was desired to alter the limits of the checkweigh or check its accuracy it was necessary to operate the checkweigh with standard weights applied to the load receiver. The inconvenience of such an operation is obvious particularly where such scales are installed in location remote from suitable storage for the standard weights and equipment for loading them on the load receiver, as in the case of highway scales.

In accordance with the present invention the above objects are realized and the handicaps of the prior art are overcome in one embodiment by a weighing and checkweighing scale which utilizes one or more load cells arranged to receive the load through a minimum of mechanical linkages and to produce an electrical response which is a function of that load. The resultant electrical signal is fed to an electrical circuit which introduces corrections and adjustments to improve the accuracy of results and, when weighing, is fed to means developing an equal and opposite electrical signal which balances the signal from the cell or cells and indicates, in terms of weight, the amount of correction necessary to attain balance. Alternatively, when checkweighing, the corrected and adjusted signal from the cells is opposed by a fixed signal of a magnitude corresponding to that which is produced when the reference weight is applied to the load receiver, and the difference between the two signals is amplified and applied to a detector which is arranged to respond to one or more signal forms of the group including a fixed signal exceeding the load signal, a fixed signal matching the load signal, and a load signal exceeding the fixed signal. When desired the detector can be constructed or adjusted to respond only when the deviation exceeds a chosen level.

The scale is provided with means for selectively producing one of several fixed standard signals corresponding to several weights to be checked. Further the several signal developing means are adjustable so that appropriate fixed standard signal levels can be chosen for the task at hand. Accurate adjustment of fixed signal level to correspond to any weight within the range of the scale is afforded by circuits which permit the desired load to be represented by the calibrated balancing potential normally employed in the weighing operation of the scale and permit the standard potential for checkweighing operation to be adjusted to that same potential. This is accomplished by checkweigh adjusting circuits which oppose the calibrated potential with the standard potential while the latter is adjusted. Accurate adjustment of the reference weight for checkweighing is assured when the calibrated source is set at that reference weight and is balanced by the standard potential.

Throughout the description and claims to this invention the term "calibrate" has been employed to signify the comparison and altering of the weighing mechanism with respect to standard weights to obtain a proper response therein, and the altering or comparison of the response of a portion of the weighing mechanism with respect to other than standard weights, e.g. to a calibrated portion of the mechanism, has been termed an "adjustment."

Selection circuits which can be actuated from locations remote from the apparatus are included to enable the apparatus to be shifted essentially instantaneously between the various checkweighing levels or to a weighing operation covering one of several ranges of weight.

A feature of the invention involves the utilization of an electrical signal in a scale circuit which has been calibrated against standard weights as a reference for adjusting a second signal to a level representative of that weight. This second signal is then employed as a basis for comparison in checkweighing operations.

A second feature includes a checkweighing apparatus from which is derived an electric signal having a magnitude which is a function of the applied load wherein an opposing signal is applied of a level corresponding in magnitude to the signal from said apparatus when subjected to a predetermined load constituting the weight against which loads are to be checked. The difference signal is employed as a measure of the deviation from the standard weight.

A third feature of the invention resides in sensing loads in a weighing and checkweighing apparatus with electrical load cells supporting a load receiving member.

Another feature comprises an apparatus which electrically checkweighs at a plurality of load levels and can be shifted from one checkweighing level to another.

A further feature includes the provision of alterable elements in the circuit of an electrical apparatus which weighs and checkweighs whereby the characteristics of the circuits individual to the various functions can be separately adjusted or calibrated.

The above and other objects and features of this invention will be understood more readily from the following detailed description when read in conjunction with the accompanying schematic circuit drawing of one form of scale constructed according to this invention. This embodiment will be described as it is employed in highway scales wherein it is desirable to check the weight of vehicles to ascertain if they exceed the legal load limit without requiring them to stop on the weighing platform. It is to be understood that this weighing and checkweighing combination and its mode of operation is applicable to other forms of electrical scales employed in other fields.

Certain of the major circuit subcombinations which cooperate to perform the primary functions of this system have been embraced by lines composed of alternate short and long dashes. These subcombinations have been assigned Roman numerals to set them apart from the individual components of the system. Included in this category are a zero adjustment circuit I, a quadrature adjustment circuit II, an electrical unit weight circuit III, a span adjustment circuit IV, a primary control circuit V, and a checkweigh circuit VI. Each of these circuits with the exception of primary control circuit V produce signals which function in the weighing and/or checkweighing operation of the system.

Referring to the drawing, the general system embraced by this invention involves a number of signal sources, advantageously voltage sources, combined in a manner which enables weighing and checkweighing to be accomplished. Functionally the system comprises a load sensing element 1 having an output signal magnitude which is a function of applied load, zero adjustment circuit I comprising a circuit connected across secondary winding 8 of transformer 3 to introduce a zero adjustment signal opposing the output signal and of a magnitude sufficient, in combination with the quadrature adjustment signal derived from quadrature adjustment circuit II, to reduce the in phase components to zero. The final compensation of the output signal is realized in a quadrature adjustment circuit II including secondary winding 14 which cooperates with the zero adjustment circuit I in balancing the no load signal and any noise developed in the circuits of the weighing system. Several checkweight signals, each of which can be adjusted to any level within a given range, and each of which is fixed in magnitude during its utilization in a checkweighing operation, can be introduced selectively by the circuit VI including secondary winding 76 of transformer 3 to oppose the output signal of the load sensing element as compensated by the zero and quadrature adjustment signals whereby that output is compared with one of those signals. In practice the checkweigh signals are set to be of the same magnitude as the compensated output developed when the load sensing means is subjected to a predetermined standard load corresponding to the value against which loads are to be checkweighed. The capacity of both the weighing and checkweighing scale functions can be increased by introducing supplemental signals from electrical unit weight circuit IV which can be calibrated to correspond to the signals from the load sensing device when subjected to standard loads, as developed across the voltage divider made up of resistances 48, 49, 56, 57 and 58 across secondary winding 46. In the weighing operation of the scale a feedback potentiometer 39, also across secondary 46, develops a signal to oppose the compensated output signal by applying the difference between those signals to a motor 29 driving its contact 37 and an indicator 38. The difference signal drives the potentiometer to balance its signal with the compensated output signal and sets the indicator to indicate the applied load. Span correction in the potentiometer 39 is effected by variable resistances in span adjustment circuit IV connected to contacts of selector switch 41.

When employed as a weighing scale, the system corrects the signal developed in the load cells 1 by means of the signals derived from the zero adjustment and quadrature adjustment circuits I and II. The resulting compensated load signal is opposed by a calibrated signal from the feedback potentiometer 39 and the net signal of the load and potentiometer is fed through amplifier 27 to drive motor 29. Motor 29 alters the potentiometer signal to balance the load signal and then becomes quiescent, maintaining the indicator arm 38 in registry with an indicium setting forth the magnitude of the load. If the load exceeds the first range of the scale and the signal capacity of the potentiometer 39, electrical unit weight circuit III can be altered to add a fixed signal increment to the signal from the potentiometer 39 opposing the compensated load signal. Correction of the span of the feedback potentiometer signal is afforded by span adjustment circuit IV either with or without the electrical unit weight signal so that the extent of motion imparted to the potentiometer adjustment and the indicator 38 by motor 29 for a compensated full load signal from the load cells 1 corresponds to the scale limits for indicator 38. During all direct weighing operations no signals from the checkweigh circuit VI are employed.

When a checkweighing operation is to be performed, signals from the checkweigh circuit VI are substituted for those of the feedback potentiometer 39 and a null detector 119 is substituted for the servomotor 29. Thus, the compensated load signal from load cells 1, zero adjustment circuit I, and quadrature adjustment circuit II is opposed by a signal from checkweigh circuit IV and the resulting net signal is fed through amplifier 27 and thence to null detector 119. The signal from the checkweigh circuit provides a standard against which the compensated load signal is compared and the null detector indicates the results of that comparison. Several ranges of checkweighing are afforded by utilizing the calibrated unit weight signals from circuit III in aiding relationship with the checkweigh circuit signals to oppose compensated load cell signals in excess of the signal capacity of the checkweigh circuit alone.

Shifting of the system from weighing operations to checkweighing is effected by means of selector switches 21, 31, 41, 51 and 61 which also enable the scale range for weighing to be selected. Substitution of a second standard signal for checkweighing is accomplished by energizing relay TR of the primary control circuit V while the selector switches are in the checkweighing position. In the illustrated embodiment, relay TR alters the signal level derived from the circuit VI which is effective in opposing the compensated load signal and supplements that signal with one derived from electrical unit weight circuit III.

The levels of the signals derived from checkweigh circuit VI are adjusted with reference to the calibrated potentiometer signal preliminary to checkweighing. This is accomplished while the selector switches 21, 31, 41, 51 and 61 are set for checkweighing by causing the system to revert partially to the weighing condition wherein the checkweighing signal supplants the compensated load signal. The necessary alterations in the system are effected by connecting the control winding 28 of the servomotor 29 to the output of amplifier 27 so that the servomotor is capable of readjusting the signal from feedback potentiometer 39 and readjusting the position of correlated indicator 38, and by energizing checkweigh adjustment relay AR in primary control circuit V. Relay AR inverts the phase of the signal from checkweigh circuit VI so that it opposes the potentiometer signal. Since no load is applied to the load receiver during checkweigh adjustment, no signal is inserted by the load cells 1. The signal from the checkweigh circuit therefore is in essence placed directly in opposition to the signal from the potentiometer 39 and the net signal of those two actuates servomotor 29 to balance them against each other. At balance the indicator sets forth the load represented by the checkweigh signal. Accordingly, the checkweigh signal can be adjusted and the indicator will follow the adjustment as the system maintains its balance. The checkweigh signal is thus set by reference to the indicator reading during checkweigh adjustment.

The second checkweigh level is adjusted while the primary adjusting conditions are maintained by energizing tandem axle relay TR in the primary control circuit V. Relay TR substitutes a second checkweigh signal for the primary signal and superimposes thereon a fixed signal from the electrical unit weight circuit III. Since the unit weight signal is calibrated, it is desirable to avoid altering it; accordingly, that signal is excluded during adjustment of the second level and the checkweigh circuit VI is adjusted to the difference between the load represented by the unit weight signal and the load to be represented by the standard checkweigh signal, e.g. to establish a standard signal representing 31,000 pounds utilizing a 20,000 pound unit weight signal in conjunction with an aiding checkweigh signal the checkweigh circuit VI is adjusted to a condition where it balances the potentiometer signal at an indicated 11,000 pounds.

The system is transferred from checkweigh adjusting operation to checkweighing by deenergizing relay AR whereby the checkweigh circuit is connected with its signals in opposition to the load signal source and by disabling motor 29. In this condition, energization of tandem axle relay TR transfers the standard signal for checkweighing from a first value derived solely from the checkweigh circuit VI to a second value derived from the checkweigh circuit and the electrical unit weight circuit III.

In the specific embodiment shown in the drawing, an electrical scale providing both weighing and checkweighing operations comprises a load sensing means which is loaded in an amount which is some given proportion of the applied load by means of a load receiving mechanism (not shown). In the case of a highway scale this mechanism is conveniently a platform 130 over which the vehicle to be weighed passes, and the load is transmitted therefrom either directly, as by sockets 130 and mating arcuate surfaces 132, or through levers (not shown) to load sensing means. For purposes of discussion, consider load sensing means 1 in the form of a conventional resistance bridge made up of a number of bonded strain gauges incorporated in a load cell structure (not shown). However, it is to be appreciated that other forms of electrical translators which produce electrical signals which are a function of the load applied to the load receiver may be used in place of the strain gauge bridges or networks. The individual resistance elements of such structures vary in resistance as a function of the strain introduced by the load into supporting elements such as columns to which they are bonded. The bridge or other load sensing combination 1 is energized by a secondary 2 of a power transformer 3 conveniently from a 60 cycle alternating current source. In a highway scale of the type under consideration here four load cells (only two of which are shown) each having its resistance elements connected as a bridge are arranged to support the four corners of the scale platform and to be directly loaded. These four cells are connected in a series network so that the voltages derived therefrom are totaled and applied to the scale circuits through output leads 4 and 5.

Output lead 4 extends through switch 6, the function of which will be discussed below, to grounded lead 7. Output lead 5 extends to the scale indicating circuits through a "zero compensation or zero adjust" circuit I comprising a transformer secondary 8 of transformer 3 and a voltage divider thereacross made up of fixed resistances 9 and 10 and a resistance 11 having a tap 12 whose position can be altered. The function of this circuit is to insert a voltage which is shifted 180° in phase with respect to the output from the load sensing elements 1 and which in cooperation with the circuit next to be discussed balances the no load voltage output of the scale load cells when it is conditioned for weighing. This function is realized by altering the position of tap 12 on resistance 11. For purposes of convenience, the voltage of the circuit I including secondary 8 and resistances 9, 10 and 11 will be termed the "zero compensation voltage."

The voltage difference between the output voltage of cells 1 and the zero compensation voltage is applied through lead 13 connected to tap 12 and a second or quadrature signal compensating circuit II connected across a secondary 14 of transformer 3. The circuit comprises a large condenser 15 and a tapped resistance 16 of such magnitude with respect to the condenser reactance at the operating frequency, conveniently sixty cycles per second, that the voltage between lead 13 and tap 17 on resistance 16 is essentially in quadrature with the zero compensation voltage. The magnitude of this quadrature component superimposed on the voltage difference is established by appropriate positioning of tap 17 whereby the quadrature components in the difference voltage are canceled. This circuit II and voltage will be termed the "quadrature compensation" circuit and voltage.

The compensated output voltage developed at lead 18 is applied through normally closed contact AR-1 of checkweigh adjustment relay AR through contact arm 20 of selector switch 21, whose function will be discussed below, through contact 23 of the switch 21, and normally closed contact AR-2 to contact arm 30 of selector switch 31.

The compensated load signal at switch 31 is fed to the amplifier 27 over lead 69 and is subjected to an opposing signal developed in the circuits between switch 31 and lead 69. Initially, any signal from the circuits between switch 31 and lead 69 is balanced by the compensated load signal at no load. When a load is imposed on cells 1, the compensated load signal is increased tending to upset this balance and applying a net signal to amplifier 29. The amplified net signal, in turn, is applied to control winding 28 of servomotor 29 causing it to rotate its armature and shaft 36. Tracing the circuits from contact 33 through resistors 49, 56, 57, 58 and 105, potentiometer 39, contact 43 and resistors 59, 66, 67 and 48 comprising the paths to potentiometer contactor 37 and thence lead 69, it will be noted that all circuit elements are of a fixed value except potentiometer 39 and resistance 66 and all can be chosen so that the potentials developed in the several loops are balanced or essentially balanced. The function of resistance 66 will be discussed, for the present it can be considered to be fixed in value also. Armature shaft 36 is connected to contact arm 37 of feedback, slide wire potentiometer 39. Hence, as the load signal increases to impose a signal on the winding 28 and rotate shaft 36, arm 37 of the potentiometer is moved in a direction increasing the signal opposing the load signal in the circuits between contact 33 and lead 69. An increase in this signal tends to reduce the unbalance or net signal fed the control winding 28 so that when balance is attained the servomotor 29 becomes quiescent. The amount of signal required from the potentiometer to rebalance the compensated load signal is thus the difference between the compensated load signal with no load on the system and that signal when the system is loaded. Thus, it is a direct function of the load and can be correlated with load by means of an indicator. One means of providing a direct reading of the signal required for balance in terms of weight is to couple an indicator arm 38 cooperating with a calibrated chart to the potentiometer arm drive. Mechanical coupling of the motor shaft can be accomplished in any convenient manner with mechanical translators for converting angular motion to rectilinear motion and/or for changing the speed ratio of the motion of the various components. Inasmuch as such translators and linkages are within the skill of the art, the coupling from motor to indicator 38 and potentiometer contact 37 has been shown only in schematic fashion by the dotted line referred to as shaft 36.

Two circuits can be considered individually in discussing the actuation of the drive for arm 37 of feedback potentiometer 39. These circuits as employed in a scale of this nature are disclosed in the copending application of Robert O. Bradley entitled Auxiliary Load Mechanism for Weighing Scale, Serial No. 580,324, filed April 24, 1956 now abandoned. In particular the compensated output voltage from load cells 1 is superimposed on a selected fraction of the voltage developed across secondary 46 of transformer 3 through contact 33 by insertion at junction point 47 of the voltage divider made up of the resistance 48 in series with resistance 49 and resistances 56, 57 and 58 in parallel therewith. The voltage of transformer secondary 46 is also applied across the feedback potentiometer 39 connected through contact arm 40 of selector switch 41 to contact 43 thence through resistance 59, variable resistance 66 and resistance 67. The portion of the circuit associated with selector switch 41 will be termed the "span compensation circuit IV." The value of resistances 59, 66 and 67 are so chosen that the change in voltage between points A and B on the potentiometer 39 as the contact 37 is moved and the indicator 38 is moved therewith from a zero designation on the indicator chart to full chart capacity is equal and opposite the change in the compensated output voltage obtained by placing a weight equal to chart capacity upon the load receiver coupled to load cells 1. Thus it is within the capacity of the system to reestablish the condition where no input is applied to the amplifier by repositioning the contact 37. Potential unbalance is conveyed to the amplifier through lead 68 connected in common to contacts 53, 54, and 55 of selector switch 51, contact 53, contact arm 50 and lead 69.

As pointed out in the aforenoted Bradley application it is often desirable to expand the capacity of a weighing scale of the type under consideration. In particular, scale capacity is so chosen that suitable sensitivity of indication is given for the purpose at hand. A highway scale of 20,000 pounds full scale capacity is desirable. When loads exceeding the full scale capacity are to be weighed on an electrical scale of this type the capacity can be increased without decreasing the sensitivity of indication by combining an additional voltage with the voltage applied across the potentiometer from secondary 46. This additional voltage is inserted by suitably positioning selector switches 21, 31, 41, 51 and 61 all or some of which may be mounted on a common shaft 70 or otherwise coupled. This expedient has been adopted in order to insure that the proper connections are established in all circuits for the various options available in the illustrated circuit; however, it is to be understood that the selector switches need not be ganged inasmuch as switches 21, 51 and 61 alter the connections only when the scale is switched from the weigh options to the checkweigh options.

The capacity of the scale is increased by altering the division of voltage across secondary 46 through suitable changes in connections of that circuit. Contacts 34 and 35 of switch 31 are connected to variable resistances 56 and 58 respectively which resistances are connected with a constant resistance 57. The variable resistances are arranged for manual positioning of their contacts to develop voltages between contacts 33 and 34 and 33 and 35 which are, for example related in some convenient manner to the voltage change across the feedback potentiometer 39 from zero to full chart capacity. Advantageously this relationship can be an equality between the voltage across contacts 33 and 34 and the full scale voltage and a doubling of that voltage by the voltage between contacts 33 and 35 whereby the scale capacity in the example is shifted from 20,000 pounds to 40,000 and 60,000 pounds respectively. Thus by turning the selector switch 31 to close contact 34 the additional fixed increment of voltage is added to the voltage in the potentiometer which balances the compensated load cell output voltage. In this condition a load equal to chart capacity on the load cells 1 carries the indicator 38 to point to the zero indicium on the chart thereby inserting a signal which is the electrical equivalent of a unit weight in the system. Electrical unit weight circuit III thus supplements the signal of the feedback potentiometer with a first unit weight signal tapped off potentiometer 56 and a second unit weight signal tapped off potentiometer 58.

A supplementary signal is provided for indicating the fixed increment of voltage added by means of switch 31 in terms of weight. This signal may be of the form shown in the Bradley application wherein the values are changed appropriately on the indicator or, less conveniently, a light or flash may be actuated to signify that the weight corresponding to the additional voltage should be added to the indicated weight. Further recording means such as printers can be coupled to the indicator to provide a permanent record of the weight applied.

Similarly, the selector switch 31 can be connected to contact 35 to pick off another fixed increment of voltage and to indicate the additional weight to be read on the indicator. If desired, more contacts may be provided to supply even more fixed increments of voltage.

As hereinbefore described, the span compensating resistance 66 functions to alter the voltage across the potentiometer 39 so that the change in voltage between the points A and B on the potentiometer as the contact 37 is moved and the indicator 38 is moved therewith from a zero designation on the chart to full chart capacity is equal and opposite to the change in load cell output voltage (sum of the four cells 1) obtained by placing a weight equal to chart capacity upon the load cells. However, the load cell output voltage is not linear over the entire load cell range which may be utilized by increasing the capacity of the weighing scale beyond the primary range of the chart. In a weighing scale, an error in linearity may be defined as the deviation of a half capacity load indication from the average of the zero and full capacity load indications. The selector switch 41 and the circuit associated therewith are used to alter the span as the capacity of the scale is changed, i.e., the switch 41 functions to alter the voltage across the feedback potentiometer 39 so that it always matches the increments of load cell output voltage in the various weighing ranges.

The contacts 43, 44 and 45 of selector switch 41 are connected to resistances 59, 71 and 72 respectively which may be connected between the span compensation resistance 66 and the potentiometer 39. The contactors 30 and 40 of selector switches 31 and 41 move as a unit. When contacts 33 and 43 are closed, sliding contact 73 is used to alter the span as hereinbefore described. When contacts 34 and 44 are closed, current passes through resistances 67, 66 and 71. Similarly, when contacts 35 and 45 are closed current passes through resistances 67, 66 and 72. Variable resistances 71 and 72 are adapted to have their sliders manually positioned during calibration so that the span is automatically and correctly altered every time the capacity of the weighing scale is increased or reduced to compensate for the non-linearity in the load cell output over the load cell range.

In practice the above described elements of the scale are calibrated by first altering the zero and quadrature compensation circuits with no load upon the load receiver to that condition which balances the amplifier input with the contact 37 near the left-hand end of potentiometer 39 and the indicator 38 reading zero. A series of standard weights are then applied to the load receiver and the circuits connected across secondary 46 altered so that the span of the scale is correct by properly positioning contact 73 on resistance 66. Electrical unit weights are next inserted while the loading is increased by the addition of appropriate standard weights to the load receiver, by switching the selector switches 31 and 41 and setting the span compensating resistances 71 and 72 and unit weight resistances 56 and 58 to values which develop voltages matching those introduced in the load cell output by the additional weight.

The above scale is arranged for checkweighing as is appropriate where it is desirable to ascertain if a vehicle exceeds the legal limit for its class without determining its weight by disconnecting the feedback potentiometer, motor and span adjust circuits and comparing the instantaneous compensated output voltage of the load cells with a fixed standard voltage of equal and opposite magnitude to the output when the cells are subjected to the load being monitored. The difference between the output and standard are applied through the amplifier 27 to a null detector 119. Where only those loads exceeding a limit are to be detected, the null detector can be polarized as by a rectifier 75 in its output circuit so that the indicator 81 in the output responds only to a positive difference, that resulting when the output exceeds the fixed standard voltage. The indicator can be in a number of forms including a lamp, an audible alarm, a printer, or a continuous recorder of a magnetic type or, when coupled to an oscilloscope, of a photographic type.

Operation of the checkweigh option is accomplished by connecting the arms 20, 30, 40, 50 and 60 of selector switches 21, 31, 41, 51 and 61 to their respective uppermost contacts 22, 32, 42, 52 and 62. This introduces a voltage developed in opposition to the output voltage of the load cells, as compensated for weighing, in the circuit across secondary 76 of transformer 3 and enables the selective connection of portions of the electrical unit weight circuit III to superimpose a unit weight voltage derived from one of those circuit portions on the voltage from the checkweigh circuit VI of a level appropriate for the range to be monitored. In the example two weight limits define the checkweigh points, a single axle limit and a tandem axle limit, however, it is to be understood that it is within the skill of one in the art following the teachings of this invention to provide means for rapidly shifting between a larger number of selected checkweigh points.

In operation the scale is energized by applying an alternating signal to supply terminals 77 which can conveniently be 115 volts at 60 cycles per second. This is connected to the various scale elements by closing double pole switch 78 to energize one winding 79 of motor 29, an indicator circuit including relay contact 80 and indicator 81, and the primary 74 of transformer 3. Weighing can then be carried out as discussed above. In order to checkweigh to determine if loads exceed some specified magnitude the checkweigh fixed voltage inserted in the system must be adjusted to a level which balances the voltage from the cells when subjected to the specified load. This adjustment is accomplished by shifting all selector switches to the checkweigh position and first readjusting the zero load condition of the scale to balance the input.

Inasmuch as the calibration of any precision instrument is an exacting and time consuming labor and particularly in an apparatus having high capacities wherein the application of standard weights of large magnitudes introduce considerable difficulties from the standpoint of physical convenience alone, a substantial advantage is realized by avoiding these requirements. The checkweighing elements of the present scale succeed in avoiding the need for calibration against loads corresponding to the limits sought by an arrangement which enables the calibrated voltage inserted in the weighing operation to be employed as a simulated load against which the checkweigh voltage can be compared during its adjustment. This arrangement utilizes a checkweigh adjustment relay having its coil AR energized by closing a switch 83 to control those contacts having reference characters including AR as a prefix and to connect the circuits of the scale in a manner appropriate for effecting the above comparison. Unidirectional current is supplied to relay coil AR, and when desired relay coil TR of the tandem axle relay in parallel therewith, by means of the rectifier 85, limiting resistance 86 and smoothing condenser 87 connected across terminals 77 of the power supply. A reduction in the voltage applied across coils AR and TR is effected by the series resistances 88 and 89 respectively.

During adjustment of the checkweighing voltage it is desirable that the indicator 38 should continuously show the load to which that voltage corresponds.

When relay coil AR is energized by closing switch 83, switch 90, which advantageously may be mechanically coupled to switch 83, is disconnected from contact 118 and engaged with contact 93 to connect the winding 28 of motor 29 across the output of amplifier 27 from terminal 91 through lead 92, contact 93 of switch 90, contacts 62 and arm 60 of selector switch 61, lead 94, winding 28 and thence through lead 95 to terminal 96. While the motor is thus connected and capable of moving potentiometer contact 37 and indicator 38, relay AR has opened contacts AR–1 and AR–2, and closed contacts AR–3 and AR–4 to insert a potential developed between junction point 99 and junction point 100 into the system with those signals from the load cells 1, zero adjustment circuit I, quadrature adjustment circuit II, span adjustment circuit IV and feedback potentiometer 39 to make up the composite or net signal to amplifier 27. This potential has been reversed in phase by the circuit arrangement shown whereby it simulates the output of the load cells 1 in that it opposes the voltage of the feedback potentiometer circuit during adjustment. Its phase is reversed to correspond to that of the feedback potentiometer and unit weight circuits during checkweigh operation by the restoration of the above mentioned contacts AR–1, AR–2, AR–3 and AR–4 controlled by relay coil AR to their initial condition. The energizing of relay coil AR also closes contacts AR–5, opens contacts AR–6, closes contacts AR–7, and opens contacts AR–8 so that the feedback potentiometer 39 with its span adjust resistances 59, 66 and 67 is connected between the checkweigh circuit IV and amplifier 27 to balance the signal of the checkweigh circuit and correlate that signal with a load level in the same manner as during the weighing operation discussed above.

The system thus balances itself by applying to the amplifier input a difference voltage between that voltage between A and B on the feedback potentiometer 39 and that voltage developed in the checkweigh circuit VI whereby the indicator 38 sets forth the load equivalent of the voltage between junction points 99 and 100.

The shift to checkweigh operation requires readjustment of the zero load condition due to the changes in the circuit. In particular, some voltage is developed between the wiper contact 37 of the feedback potentiometer 39 and ground when the contact is at the zero position. This voltage is compensated by the signal from the zero adjustment circuit I when the system is operating under the weighing option. However, during the checkweighing option no signal in the feedback potentiometer is effective hence the zero adjustment, if maintained, is overcompensated and introduces an inaccuracy in the adjustment of the checkweighing options unless a further compensation is introduced. This advantageously is accomplished without altering the zero adjustment in circuit I for the weighing option since it may be desired to return the scale to the weigh option without reestablishing that zero adjustment. A checkweigh zero adjustment is introduced as a voltage across a potentiometer 105 between contactor 106 and junction 108 by connecting the contactor 106 of that potentiometer to the grounded amplifier input terminal and disconnecting the load cells, checkweigh circuit VI, quadrature adjustment circuit II, and zero adjustment circuit I therefrom through switch 6 which is connected to its contact 107. Since the circuit is in checkweigh adjustment condition, shifting of the position of contact 106 causes a rebalancing of feedback potentiometer 39. Thus the zero adjustment for the checkweigh circuit is accomplished by positioning contact arm 106 on potentiometer 105 so that the potential developed therein between the contactor and junction 108 is balanced by the feedback potentiometer 39 when in its calibrated zero position. This is indicated when the pointer is driven by motor 29 to the zero indicium on the chart of indicator 38. Switch 6 is then returned to lead 4 and the checkweigh voltages adjusted.

Assume for purposes of illustration that two weight limits are to be checked in a highway scale according to this invention having a full scale capacity of 20,000 pounds. Assume further that one limit is within the full scale capacity, for example, a single axle limit of 19,000 pounds, and that the other limit exceeds the full scale capacity, for example, a tandem axle limit of 31,000 pounds. Now consider the adjustment of the checkweigh to detect single axle overloads. In the disclosed embodiment when switch 83 is closed and switch 90 is engaged with pole 93 to establish their checkweight adjustment positions, a voltage is applied to the input of amplifier 27 representing the difference between the feedback potentiometer voltage and the voltage between junction points 99 and 100. As the position of contact 109 on resistance 110 is altered, the combined feedback potentiometer and checkweigh voltages are unbalanced until the motor has repositioned contactor 37 on potentiometer 39 and indicator 38. Thus, a 19,000 pounds checkweigh voltage can be introduced between junction points 99 and 100 by positioning contactor 109 so that the indicator 38 reads 19,000 pounds when the system is balanced.

The limit for the tandem axle is then introduced into the checkweigh by altering the circuits of the checkweigh section across secondary 76 and the feedback section across secondary 46 so that the voltages therein balance while the indicator reads either 11,000 or 31,000 pounds depending upon the degree of refinement employed in the scale construction. This is accomplished by closing contactor 111 to energize relay coil TR of the tandem axle relay controlling those contacts having reference characters with a TR prefix whereby normally closed contacts TR-1, TR-3 and TR-5 are opened and normally open contacts TR-2, TR-4 and TR-6 are closed. A new voltage, that between adjustable contact 112 on resistance 113 and junction point 100, constitutes the checkweigh voltage against which the feedback potentiometer circuit voltage is compared for adjustment. Since the load to be checkweighed exceeds the full scale capacity, the checkweight capacity is increased by effectively inserting a unit weight thereby changing the capacity to 40,000 pounds in this example and shifting the indicator range to an interval between 20,000 and 40,000 pounds. Inasmuch as the first unit weight voltage has been calibrated to 20,000 pounds for scale operation it is only necessary to combine that voltage with a voltage corresponding to an additional eleven thousand pounds. Therefore, while the closing of contacts TR-4 and the opening of contacts TR-3 serves to introduce the unit weight voltage through contact 32 when tandem axle checkweighing, during checkweigh adjustment this calibrated voltage is bypassed since contacts AR-5 are closed and contacts AR-6 are open.

A refinement which is not shown in the drawings can be incorporated in the indicator by altering it to set forth that 20,000 pounds should be added to the indicated load. This may be accomplished by suitable sensing means (not shown) in the first unit weight circuit as in the lead including contacts AR-6, however since it is reasonable to expect that checkweigh adjustment will be by operators of reasonable skill and according to operator instructions, ordinarily this added precaution offered by changing the indicator is unnecessary.

Accordingly, the contact 112 on resistance 113 is set to develop a voltage corresponding to eleven thousand pounds on the load cells by comparing it with the feedback potentiometer voltage as read in terms of load on indicator 38. When returned from the checkweigh adjustment state to the checkweighing state, the calibrated voltage of the twenty thousand pound unit weight is added to the adjusted eleven thousand pound voltage from the checkweigh section to form a thirty-one thousand pound checkweigh voltage against which the load cell output is compared.

The deviation from the correct span due to the non-linear response of the load cells in the range of operation wherein a unit weight voltage is required is corrected for checkweigh operation by inclusion of the span adjust resistances 67, 66 and 71 which were introduced in calibrating the weighing operation of the scale. These resistances are in the path created by the closing of contacts TR-6 and the opening of contacts TR-5, and through contacts 42 and 40 of selector switch 41.

With the checkweigh sections adjusted, checkweigh operation is realized by transferring switches 83 and 90 to their initial positions. Relay contacts AR-1, AR-2, AR-3, AR-4, AR-5, AR-6, AR-7 and AR-8 all then return to their indicated initial condition. Switch 90 closes to contact 118 thereby short circuiting winding 28 of motor 29, removing that winding from across output terminals 91 and 96 of amplifier 27, and substituting resistance 122 for the winding 28 as the amplifier load. Resistor 122 is provided to avoid damage to the amplifier such as might occur if anode current were cut off in a amplifier having an output stage including a tube whose screen grid was maintained at B+. The opening of contact AR-7 and the closing of contact AR-8 while contacts 50 and 52 of selector switch 51 are engaged eliminates the feedback potentiometer as a source of balancing voltage against the load cell output voltage and introduces in its stead the adjusted checkweigh zero voltage developed across potentiometer 105, and the closing of contacts AR-1 and AR-2 and opening of contacts AR-3 and AR-4 inverts the phase of the checkweigh comparison voltage so that it is in opposition to the load cell output voltage and in phase with the unit weight voltage, when that voltage is required.

The application of a load to the cells below that for which the checkweigh voltage between junction points 99 and 100 has been adjusted produces a voltage which is less than the standard of comparison offered by the checkweigh voltage. The difference between these voltages is fed to the amplifier 27 and thence through a null detector 119 comprising a phase sensitive detector supplying reversible unidirectional current to the coil 120 of an alarm relay whose armature actuates contact 80. Operation of the alarm circuit is avoided when the unbalance is due to a load below the limit or no load by the rectifier 75 connected in the null detector output in series with coil 120 and blocking the passage of current in that coil of the polarity characteristic of a signal below the load limit. When a load exceeding the limit creates a voltage unbalance of the opposite sign, the rectifier passes current to pickup contact 80 and actuate a suitable indicator 81.

If the operator chooses to shift to the higher limit while checkweighing he can do so by depressing contactor 111 to energize relay coil TR and operate contacts TR-1 through TR-6 inclusive. This combines the checkweigh voltage on resistance 113 in aiding relation with the first unit weight voltage tapped off resistance 56 as the opposing standard of comparison for the load cell output voltage and applies the resulting voltage difference as compensated by the voltage drop in the span compensating resistance 71 for the unit weight to the amplifier.

Since the null detector and alarm circuit are utilized only during checkweighing operation and their operation at other times is undesirable, a switch 121 is provided between the null detector and the amplifier. This switch is permitted to remain open during weighing and during the adjustment of the checkweigh voltages and is closed to connect the alarm circuit when checkweighing.

Thus, it is evident that the weighing system comprises an electrical translating element having an output signal magnitude which is a function of the load, load cell 1, a first alterable signal source that supplies a signal in opposition to the output signal of the element, feedback potentiometer 39, means responsive to the difference between the signals of the element and the source for altering the signal from the source to a level balancing the signal from the element, motor 29, and indicating means coupled to the source and calibrated with the source in terms of the applied load, indicator 38. Supplementing and cooperating with this combination to provide a standard signal against which checkweighing is accomplished is a second alterable signal source, checkweigh circuit VI, means for selectively connecting the first and second alterable signal sources in opposition, adjusting relay contacts AR-3 and AR-4, whereby the adjustment of the second source VI to a fixed signal level is balanced by said first source, potentiometer 39 through the operation of the signal difference responsive means, motor 29, to indicate on the indicating means 38 the load corresponding to the fixed signal level. In checkweighing against the standard load represented by the adjusted fixed signal level, de-energization of relay AR closes contacts AR-1 and AR-2 to selectively connect the fixed signal level of the second alterable signal source VI in opposition to the signal from the element, load cells 1, and opens contacts AR-7 and closes contacts AR-8 which by virtue of the engagement of contact arm 50 with contact 52 selectively disconnects the first source, potentiometer 39, from the element, load cells 1. During checkweighing, null detector 119 constitutes electroresponsive means operative when the second source and the element are connected and responsive to a selected level of net signal from the second source and the element, a load cell signal exceeding the checkweigh signal.

An additional refinement of this combination comprises a checkweigh circuit IV which includes a plurality of means, potentiometers 110 and 113, each for producing an individual signal level, and means, tandem axle relay TR and its contacts TR-1 and TR-2, for selectively connecting one of said second signal source means as the second signal source in opposition to the load cells. This provides a plurality of checkweighing standard signals which are individually selectively as desired.

The range of the loads weighed or checkweighed by the system is extended by including a unit weight signal derived from potentiometer 56 of circuit III utilized as a third alterable signal source calibrated (as a portion of the signal for weighing) to produce a fixed signal corresponding to the signal derived from the element, load cells 1, when a fixed load is applied. When weighing, the setting of selector switch 31 so that contact 34 is engaged by switch arm 30 introduces the unit weight signal from potentiometer 56 in signal aiding relationship with the signal of feedback potentiometer 39 and opposing the signal of the load cells. Thus, switch 31 constitutes means for selectively connecting the third source with the first source in a signal aiding relationship. The unit weight signal is also used in checkweighing when contact arm 30 of selector switch 31 engages contact 32 and tandem axle relay TR has been energized to close contacts TR-4 whereby the unit weight signal is placed in aiding relationship with the checkweigh signal from potentiometer 113, these elements comprising means for selectively connecting the third source with the second source in a signal aiding relationship.

While the invention has been described in terms of a specific embodiment it is to be understood that modifications can be made therein without departing from its spirit or scope. For example, the apparatus might be modified to monitor loads which are within certain limits by employing a null detector which responds only when a predetermined level of difference exists between the load cell voltages and the comparison voltage. The sensing of these differences can be such that different magnitudes of deviation from the optimum are indicated far below and above optimum loads whereby optimum would be indicated by a true null, a below optimum acceptance level would be indicated by a circuit responsive to both polarity and signal level and above optimum would similarly be indicated by a circuit responsive to the opposite polarity and the same or a different signal level.

Having described the invention, I claim:

1. An electrical scale comprising a load receiver, a strain gauge network mechanically coupled to the load receiver and producing an output voltage which is a function of the load applied to said load receiver, a first calibrated voltage source alterable to produce a voltage corresponding to that produced by the network in response to a given load, means for selectively connecting said calibrated source to said network with its signal in opposition to the network signal, indicating means coupled to said first source to set forth the load equivalent of the source voltage, a second alterable voltage source, first selectively actuated means for connecting said second alterable source with its signal in opposition to the signal of said calibrated source whereby said second source can be adjusted to a fixed voltage level when said first and second source signals are balanced, said resulting fixed level corresponding to that produced by the network when subjected to a load as indicated on said indicating means, second selectively actuated means for disconnecting said first source from said network and connecting the fixed voltage of said second source in phase opposition with the output voltage of said network, and means responsive to a predetermined voltage difference between the fixed level and network output.

2. A scale for measuring loads comprising a load receiver, an electrical translating element mechanically coupled to said load receiver and having an output signal magnitude which is a function of the load applied to said receiver, a first alterable signal source selectively connectable with its signal in opposition to the output signal of said element, means responsive to the difference between the signals of said element and said source for altering the signal from said source to a level balancing the signal from said element, indicating means coupled to said source and calibrated with said source in terms of the load applied to said receiver, a second alterable signal source adapted selectively to provide a fixed signal level within a range of signal levels, means for selectively connecting said first and second alterable signal sources in opposition whereby the adjustment of said second source to a fixed signal level within said range of levels is balanced by said first source through the operation of said signal difference responsive means to indicate on said indicating means the load corresponding to the fixed signal level, means for selectively connecting the fixed signal level of said second alterable signal source in opposition to the signal from said element and for selectively disconnecting said first source from said element, and electroresponsive means operative when said second source and said element are connected and responsive to a selected level of net signal from said second source and said element.

3. A scale in accordance with claim 2 having a third alterable signal source calibrated to produce a fixed signal corresponding to the signal derived from said element when a fixed load is applied to said receiver, means for selectively connecting said third source with said first source in a signal aiding relationship, and means for selectively connecting said third source with said second source in a signal aiding relationship.

4. A scale in accordance with claim 2 wherein said second signal source includes a plurality of means, each for producing an individual signal level, and means for selectively connecting one of said second signal source means as said second signal source.

5. Apparatus for measuring loads comprising a load receiver, an electrical translating element having an output signal magnitude which is a function of the load applied to the load receiver, a first signal source calibrated to produce a signal of a fixed magnitude corresponding to the signal from said element when said load receiver is subjected to a predetermined load, a second signal source arranged to produce a plurality of signals each of a different predetermined fixed magnitude, each of said signals of a predetermined fixed magnitude corresponding to the signal from said element when said load receiver is subjected to a predetermined load, control means for selecting one of said predetermined signals from said second source, conductive connections combining the output signal of said element and the selected signal of said second source in opposition, control means for selectively connecting said first source in aiding relationship to the selected signal from said second source and opposing the signal from said element, and electroresponsive means responsive to a selected level of net signal resulting from the combined signals.

6. Apparatus for measuring loads comprising a load receiver, an electrical translating element having an output signal magnitude which is a function of the load applied to the load receiver, a signal source calibrated with respect to said translating element to produce a signal of a magnitude equal to that produced by said translating element in response to a given load, an alterable signal source, means for selectively connecting said calibrated signal source and said alterable signal source with their signals in opposition whereby said alterable source can be adjusted to a fixed output signal level balancing the signal which is representative of the given load and is issued by said calibrated source, means for selectively connecting said alterable source and said translating element to combine the fixed output signal of said alterable source in opposition with the signal of said translating element, and electroresponsive means responsive to a selected level of net signal resulting from the combined signals.

7. Apparatus for measuring loads comprising a load receiver, an electrical translating element having an output signal magnitude which is a function of the load applied to said load receiver, a first alterable signal source calibrated with respect to said translating element to produce signals of magnitudes equal to those issuing from said element in response to a range of loads, indicator means coupled to said first alterable signal source and setting forth the load corresponding to a signal therefrom, a second alterable signal source, means for selectively connecting said first signal source and said second signal source with their signals in opposition, means to balance said connected first and second signal sources while said indicator indicates a given load to establish a predetermined fixed output signal in said second source, means for selectively connecting said second alterable signal source with said translating element to combine said predetermined fixed output signal from said second signal source in opposition with the signal of said translating element, and electroresponsive means responsive to a selected level of net signal resulting from the combined signals.

References Cited in the file of this patent

UNITED STATES PATENTS

| | | |
|---|---|---|
| 2,610,052 | MacGeorge | Sept. 9, 1952 |
| 2,630,007 | Howe | Mar. 3, 1953 |
| 2,678,206 | Maldoon | May 11, 1954 |
| 2,766,981 | Lauler | Oct. 16, 1956 |